United States Patent [19]
Greco et al.

[11] Patent Number: 5,568,540
[45] Date of Patent: Oct. 22, 1996

[54] METHOD AND APPARATUS FOR SELECTING AND PLAYING A VOICE MAIL MESSAGE

[75] Inventors: Robert C. Greco; Michael J. Robinson, both of Seattle; Paul M. Dunn, Bainbridge Island, all of Wash.

[73] Assignee: Active Voice Corporation, Seattle, Wash.

[21] Appl. No.: 422,700

[22] Filed: Apr. 14, 1995

Related U.S. Application Data

[63] Continuation-in-part of Ser. No. 119,380, Sep. 13, 1993, Pat. No. 5,434,906, and a continuation-in-part of Ser. No. 125,606, Sep. 22, 1993, Pat. No. 5,533,102.

[51] Int. Cl.$^6$ .................................................. H04M 1/64
[52] U.S. Cl. .......................................... 379/89; 379/88
[58] Field of Search ........................... 379/67, 76, 88, 379/89, 71, 84, 210, 211, 212, 213, 214, 215

[56] References Cited

U.S. PATENT DOCUMENTS

| | | | |
|---|---|---|---|
| 4,544,804 | 10/1985 | Herr et al. ............................... | 379/210 |
| 4,661,975 | 4/1987 | Brecher .................................... | 379/211 |
| 4,696,028 | 9/1987 | Morganstein et al. ................. | 379/212 |
| 4,697,282 | 9/1987 | Winter et al. ........................... | 379/84 |
| 4,723,273 | 2/1988 | Diesel et al. ............................ | 379/211 |
| 4,747,124 | 5/1988 | Ladd ........................................ | 379/67 |
| 4,783,796 | 11/1988 | Ladd ........................................ | 379/67 |
| 4,809,321 | 2/1989 | Morganstein et al. ................. | 379/211 |
| 4,811,381 | 3/1989 | Woo et al. ............................... | 379/67 |
| 4,853,952 | 8/1989 | Jachmann et al. ...................... | 379/88 |
| 4,866,755 | 9/1989 | Hashimoto ............................... | 379/96 |
| 4,926,462 | 5/1990 | Ladd et al. .............................. | 379/89 |
| 4,935,156 | 6/1990 | Hellwarth et al. ...................... | 379/114 |
| 4,942,598 | 7/1990 | Davis ....................................... | 379/211 |
| 4,969,136 | 11/1990 | Chamberlin et al. .................... | 379/75 |

(List continued on next page.)

FOREIGN PATENT DOCUMENTS

| | | | |
|---|---|---|---|
| 2577093 | 8/1986 | France ..................................... | 379/76 |
| 61-39756 | 2/1986 | Japan ....................................... | 379/76 |

OTHER PUBLICATIONS

"CWD Feature Requirements", Dec., 1987.
McNinch, "Screen Based Telephony", Apr. 1990 IEEE Communications Magazine, pp. 34–38.
"Call Waiting Deluxe Feature", Apr., 1993.
*Star Talk Set Up and Operation Guide,* Sec. 2, "Learning About StarTalk," pp. 1–7. (undated).
"Getting the Message Just Got Easier," *StarTalk,* Northern Telecom. (brochure) (undated).
Chris Schmandt and Stephen Casner, "Phonetool: Integrating Telephones and Workstations," *IEEE Communication Society,* IEEE Global Telecommunications Conference, Nov. 27–30, 1989, pp. 0970–0974.
"The CallXpress3 CallServer Family", Applied Voice Technology, (brochure) (undated).

(List continued on next page.)

*Primary Examiner*—Krista M. Zele
*Assistant Examiner*—Daniel S. Hunter
*Attorney, Agent, or Firm*—Graybeal Jackson Haley & Johnson

[57] ABSTRACT

A graphical user interface for the display of voice mail message information and playing voice mail messages through a computer speaker. Using a mouse, the messages can be manipulated individually or in groups. Using the mouse or the keyboard, the sender of a message can add textual copy or addressing to a message. The display also includes, merged into a single list, e-mail messages and fax messages for the user. The interface includes a facility for exporting voice mail messages into multimedia documents and importing sound clips from multimedia documents into voice mail messages. If the sender of a message does not want the recipient to copy the message for further distribution to others, the sender may designate the message as "Private", and the system will not allow the message to be copied.

12 Claims, 4 Drawing Sheets

FOREIGN PATENT DOCUMENTS

| | | | |
|---|---|---|---|
| 4,972,462 | 11/1990 | Shibata | 379/88 |
| 4,975,941 | 12/1990 | Morganstein et al. | 379/88 |
| 4,985,913 | 1/1991 | Shalom et al. | 379/76 |
| 5,007,076 | 4/1991 | Blakley | 379/215 |
| 5,008,927 | 4/1991 | Weiss et al. | 379/98 |
| 5,027,384 | 6/1991 | Morganstein | 379/67 |
| 5,029,196 | 7/1991 | Morganstein | 377/67 |
| 5,029,198 | 7/1991 | Walpole et al. | 379/88 |
| 5,031,205 | 7/1991 | Phillips | 379/88 |
| 5,058,152 | 10/1991 | Solomon et al. | 379/196 |
| 5,127,003 | 6/1992 | Doll, Jr. et al. | 370/110.1 |
| 5,168,515 | 12/1992 | Gechter et al. | 379/265 |
| 5,172,404 | 12/1992 | Hashimoto | 379/67 |
| 5,228,073 | 7/1993 | Smith | 379/170 |
| 5,278,894 | 1/1994 | Shaw | 379/67 |
| 5,283,818 | 2/1994 | Klausner et al. | 379/67 |
| 5,309,505 | 5/1994 | Szlam et al. | 379/77 |
| 5,309,512 | 5/1994 | Blackmon et al. | 379/210 |
| 5,317,630 | 5/1994 | Feinberg et al. | 379/210 |
| 5,327,486 | 7/1994 | Wolff et al. | 379/214 |
| 5,333,266 | 7/1994 | Boaz et al. | 395/200 |
| 5,402,499 | 3/1995 | Robinson et al. | 381/119 |

OTHER PUBLICATIONS

"The VMX Desktop Product", VMX, Inc. (brochure) (undated).

"Repartee", Active Voice Corporation. (brochure) Mar. 1994.

"*OneView* for Windows", Centigram Communications Corporation. (brochure) (undated).

"Desktop for Windows", Applied Voice Technology. (brochure) (undated).

"Announcing the Electronic Receptionist", Jan., 1993 (undated).

METHOD AND APPARATUS FOR SELECTING AND PLAYING A VOICE MAIL MESSAGE

TECHNICAL FIELD

This invention relates to telephone switching systems with voice mail features. This application is a continuation-in-part of prior U.S. patent applications Ser. No. 08/119,380 filed Sep. 13, 1993, now U.S. Pat. No. 5,434,906, entitled "Method and Apparatus for Processing an Incoming Call in a Communication System", and Ser. No. 08/125,606 filed Sep. 22, 1993, now U.S. Pat. No. 5,533,102, entitled "Telephone Auto Attendant System for Delivering Chosen Greetings to Callers While on the Phone".

BACKGROUND OF THE INVENTION

Voice mail systems allow telephone callers to leave recorded messages for a called party when the called party is unavailable. Whether the voice mail system is deployed with a private branch exchange (PBX) switch or with a central office telephone switching system, one mail box is assigned for each telephone extension. A typical answering machine is a special case of a voice mail system in which equipment for a single voice mail box is deployed at the extension rather than at the switch. For voice mail box systems, which are based on a continuous magnetic tape, such as conventional answering machine-type voice mail systems, the messages are played back sequentially. It is very difficult for the user to select one of the messages to hear first and a prior message to hear next. In voice mail systems where messages are stored digitally on a magnetic disk, they may be easily retrieved in random order. Some such systems play for the user a list or summary of all of the messages in the mail box and allow the user to select, after hearing the list or summary, which of the messages should be played.

SUMMARY OF THE INVENTION

The present invention provides, by economical means, a superior user interface for voice mail systems. The extension owner's user interface includes a visual display capable of alpha-numeric output and one or more physical devices for input by any of the known computer input methods, including a keypad with a few keys, a full keyboard with all alphabetic and numeric characters and/or a pointing device for selecting items displayed on the display. The user interface attached to the additional communications link may also include a speaker for sound output. The display of voice mail message information can be read by the owner much more quickly than the same information can be played in audio form, and, because it is silent, it will not interfere with a telephone or other conversation. The visual display can also be used to convey much more information than can feasibly be accomplished by voice.

The invented voice mail interface system allows many lines of textual and graphical information to be displayed on the screen at one time so that the user can quickly read the information and select any one of numerous messages to be played either on the telephone or via a separate speaker. While playing messages, the user interface displays graphical control buttons allowing the user to easily rewind the message, pause, or skip ahead, by using the mouse to click on the appropriate button. The user can listen to the messages in any order at any time. A screen icon is associated with each message and, for messages which the user has not yet heard, the icon flashes to indicate it is an unheard message. By highlighting a message, the user can also delete or archive a message or forward a copy to another user. Entire groups of selected messages can be archived, deleted, or forwarded in a single step.

The interface also allows a user to prepare textual information to accompany a voice mail message to be sent by the user. The user can add a textual copy of the sender's name, the date, the time sent, and a subject summary, all of which can then be displayed when the recipient uses a similar system to retrieve the message.

The system allows on screen message addressing which is faster than sending a message using the telephone key pad. The system maintains an alphabetical listing of all voice mail subscribers, groups, and guests which can be selected. Users can address new messages or redirect messages with a click of the mouse.

In addition to displaying voice mail messages, the invention may be configured to also display at the same time, merged in a single list, e-mail messages and fax messages stored in the system ready to be viewed on the screen or printed on a printer. Each type of message is associated with a distinctive icon to identify the type of message.

The system includes a facility for exporting voice mail messages into a format usable on multimedia-capable personal computers. The voice mail message can then be edited and incorporated as a sound portion of any multimedia document. Similarly, an edited sound clip from a multimedia document can be copied into a voice mail message before the message is sent.

If the sender of a message does not want the recipient to copy the message for further distribution to others, the sender can designate the message as "Private". The system then will not allow the message to be copied from the recipient's mail box into the voice mail box of another party and will not allow the message to be copied for incorporation into a multimedia document.

DETAILED DESCRIPTION OF THE INVENTION

Figure 1:
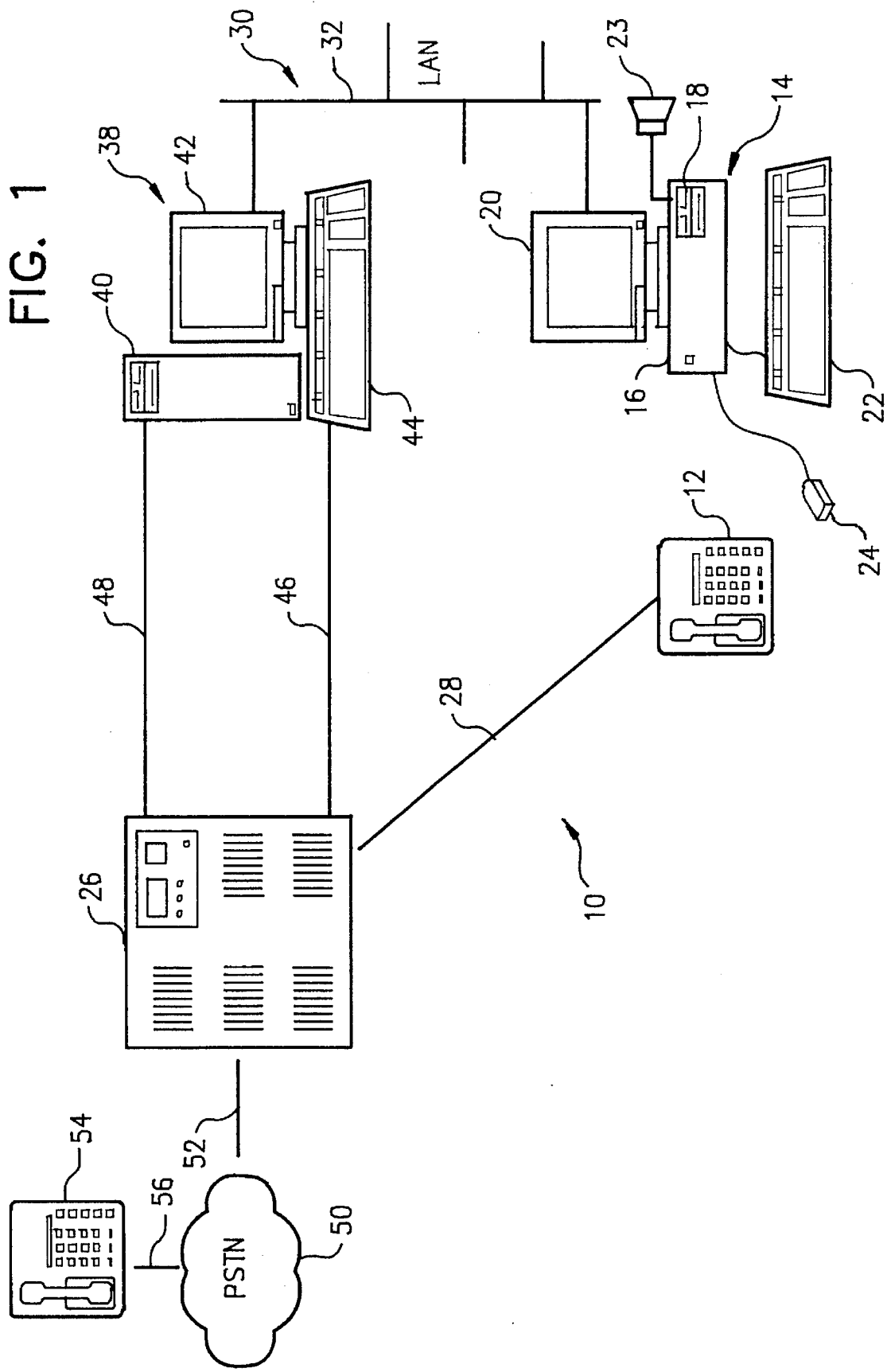
FIG. 1 is a schematic diagram showing a first embodiment for carrying out the invention.

FIG. 1 is a schematic diagram showing a first embodiment for carrying out an aspect of the invention. The first embodiment of the apparatus 10 includes a user's telephone extension 12 and a programmed personal computer 14 located near the user's telephone extension 12. The programmed personal computer 14 includes a housing 16 that encloses a conventional microprocessor (such as an Intel 486 microprocessor, not shown) and other conventional electronic circuitry associated with the microprocessor. The housing 16 also encloses one or more disk drives, including a floppy disk drive 18 and a hard disk drive (not shown) that contains the client program which the microprocessor is executing as well as data which the program requires while it is executing. The programmed personal computer 14 also includes a display 20, a keyboard 22, a speaker 23 and a pointing device 24, such as a mouse. The display 20, the keyboard 22 and the pointing device 24 are all connected to the housing 16 through conventional cables (not shown).

When the user for the user extension telephone 12 is in the vicinity of the telephone 12 and the programmed personal computer 14, it is possible for the user to use the telephone 12, to operate the programmed personal computer it through the keyboard 22 and the mouse 24, and to observe the display 20. If the user is using the first embodiment of the claimed apparatus, the user can use the programmed personal computer 14 to see information concerning callers who are leaving messages in the user's voice mail box or calling the user's extension telephone 12 and to issue commands to the programmed personal computer 14 to handle the telephone calls by the callers.

The telephone 12 of the system 10 is connected to a private branch exchange (PBX) 26 through a first communication channel 28 that can carry the voice of a caller to the user (called party). The programmed personal computer 14 is connected to a local area network (LAN) 30 that includes an interconnecting bus 32 to which a call processor 38, configured to provide voice mail and a server, is connected. The programmed client personal computer 14 and the server communicate directly with each other using a client-server protocol, such as remote procedure calls, in accordance with conventional LAN operation. The communications protocol incorporates a remote procedure call (RPC) over Named Pipes or TCP/IP.

The call processor and server system 38 includes a programmed personal computer 40 with a voice board, such as supplied by Dialogic of New Jersey or Rhetorex of California (not shown), a display 42, and a keyboard 44 which are connected to the programmed personal computer 40 in a conventional manner. The personal computer 40 runs the IBM OS/2 operating system and is programmed to cause the call processor system 38 to function as a voice mail system. The voice board inside the computer 40, in turn, is connected to the PBX 26 through a bidirectional link 48 that carries telephone PBX signalling and voice data. Optionally, the call processor system 38 and the PBX 26 can also be interconnected with a bidirectional (OAI) digital link 46.

The bidirectional link 48, (with or without the OAI link 46), and the interconnecting bus 32 form a second, bidirectional communication channel that carries information between the telephone switch with voice mail system and the user.

The PBX 26 is connected to the public switched telephone network (PSTN) 50 through a standard telephone line 52. The telephone network 50 can be accessed by a caller from an outside telephone 54 through the line 56.

When in use, the system 10 (see FIG. 1) will operate as follows. A caller at the outside telephone 54 will dial the telephone number of the user, which will connect the outside telephone 54 to the telephone network 50 through the line The network 50 will then connect the outside telephone 54 to the PBX 26 through the line 52. The PBX 26 will cause the caller on the outside telephone 54 to interact with the call processor system 38 which performs the functions of a voice mail system. If the caller is sent to voice mail by the system or by a person who received the call, the call processor 38 will begin to record a message and, as a server, cause the client computer 14 to display appropriate information on its display 20 for the user to read.

When sounds come from the PBX on voice line 48, the speech is transformed to digital form under the Dialogic adaptive differential pulse code modulation (ADPCM) algorithm (available from Dialogic Corporation, Parsippany, N.J.) and stored in an 8K buffer on the Dialogic board. When the buffer is full, its contents are written to a file, opened under the operating system for both read and write, on the hard disk in the server using a first thread of the server software. For transmission across the network after a message has been left, the voice data is read off the hard disk by a second thread of the server software. The speech file is then received by the user's personal computer 14, converted to the file format known as the Waveform audio file format specification provided by Microsoft Corporation, and played according to the multimedia file format specifications of the Microsoft Windows environment. These file format specifications are described in the Multimedia Programmer's Reference, available from the Microsoft Corporation, Redmond, Wash.

The sound data received by the client was sampled at 6000 Hz and may be easily converted from digital to analog at the same rate. If the sound card in the personal computer can operate at this rate, no interpolation is required. Many sound cards cannot operate at this rate, but can operate at 11,025 Hz. In this case, the data is interpolated to produce sound data suitable for conversion from 11,025 Hz.

Figure 2:
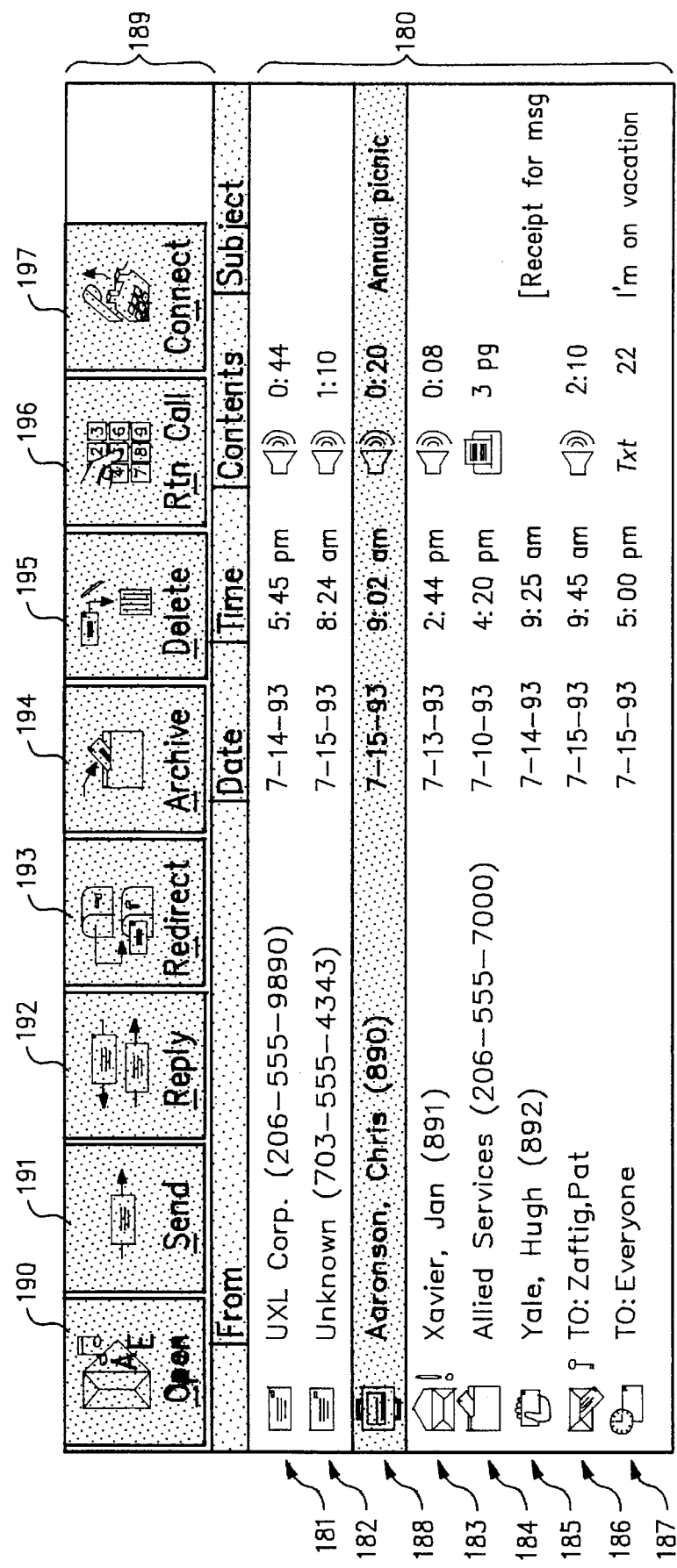
FIG. 2 shows a screen display of voice mail messages, a fax message, and an e-mail message as displayed by the user interface.

FIG. 2 shows the principal screen display of the system. Each voice mail message is displayed as a line of information in the message information field 180. The first column in the field indicates whether the message is a new message 181, a new group message 188, an old message 183, an archived message with the number of days archived indicated 184, a return receipt indicating that a message has been read or heard by a recipient 185, a message that has been sent and is waiting to be read or heard by the recipient 186, or a message waiting to be delivered at a specified time in the future 187. The first column also indicates with an exclamation mark a message that is urgent 183 or a message that is private 186 and cannot be copied, in whole or in part, to another message or redirected to another voice mail box. For each new message that has not yet been heard or read, the icon in the first column flashes on and off to catch the user's attention.

The second column indicates from whom the message has been received to the extent such information is known by the system. If the call was received with caller ID, the telephone number is indicated in parenthesis 181, 182, and 184. If the call originated from another extension within the system, the name of the extension owner and the extension number are displayed 188, 183, 185. For outgoing messages, this column specifies who the message is to rather than who it is from 186, 187.

The third column specifies the date the message was sent or is to be sent if it is to be sent in the future. The fourth column indicates the time the message was sent or is to be sent if it is to be sent in the future. The fifth column specifies whether the message is a voice mail message 181, 182, 188, 183, 186, a fax message 184, or an e-mail message 187. This column also specifies the duration in seconds of a voice mail message, the number of pages of a fax message, or the number of lines of an e-mail message.

The last column displays a short subject reference if the message was sent from another extension with similar equipment 188, 187. If the message is a receipt indicating that another party has received a message sent by the user 185, such information is displayed in this column.

Figure 3:
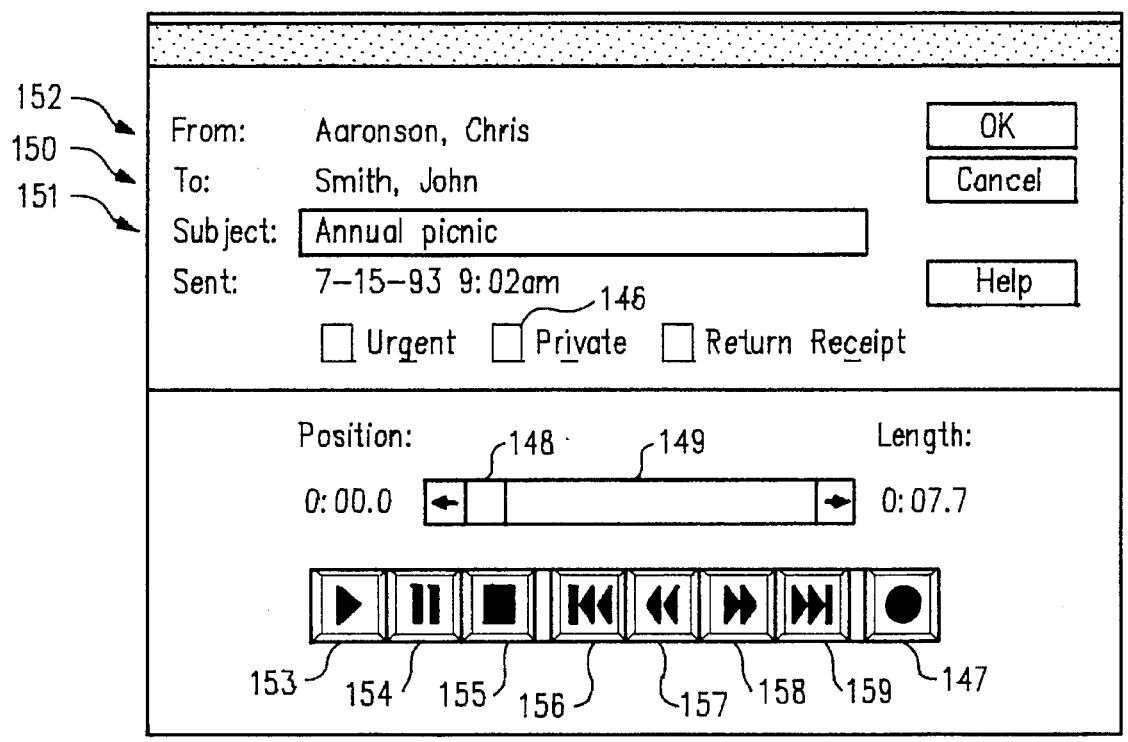
FIG. 3 shows a pop-up window with buttons for controlling the playback of a message.

Above the message information field 180 is a tool bar 189 with a button for each of the commands that a user can execute with respect to a message or a group of messages. To execute one of the commands, the user highlights one or more of the messages as shown in line 188 and then selects one of the command buttons 190-197. The "Open" command 190 plays a voice mail message or displays a fax or e-mail message. The "Send" command 191 allows the user to select on the screen or enter at the keyboard the name of a person with a mail box on the system or the number of an extension with a mail box on the system, as shown in FIG. 3, lines 150 and 151, select the "Connect" button 197 to connect the user's telephone to the voice mail system, record the voice mail message to go with the screen entered text, and then select the "Send" button 191 to send the message. The "Reply" button 192 functions like the send button except that it automatically addresses the message to the person who sent a message that is highlighted as shown in line 188 of field 180. The "Redirect"button 193 allows a message received to be sent again to another party. The "Archive" button allows a message to be archived for a number of days. The number of days is shown in the archive icon as shown in line 184. Groups of calls may be highlighted and archived all at one time. The "Delete" button 195 allows individual messages or groups of messages to be deleted. For each message for which the system captured a telephone number as shown in lines 181, 182 and 184 of field 180, the "Return Call"button 196 will automatically dial the number for returning the call. After dialing a number, to connect the call to the user's telephone, the "Connect" button 197 is selected.

Voice mail messages may be listened to on the telephone or, if the user's computer includes a speaker with multimedia sound playback support, the message may be played on the speaker even if the user is using the telephone for another call.

When the user is listening to a voice mail message, the screen display of FIG. 3 appears on the user's computer screen. The first line of information 152 shows who the message is from, like the information in FIG. 2. Unlike the information in FIG. 2, the second line 150 specifies who the message is addressed to, which is typically the user, but may also be other persons, which information would be of interest to the user. The subject of the message is displayed on the third line 151 with a larger field than available in FIG. 2, allowing more information to be displayed. Using the control buttons near the bottom of the window allows the user to play 153, pause 154, stop 155, rewind to the beginning 156, rewind a few seconds 157, forward a few seconds 158, or forward to the end 159. A bar graph 149 graphically shows the length of the message and a slider 148 graphically shows the present position within that length. By using the mouse to move the slider, the user may start playing the message at any point. A record button 147 is selected to record a voice mail message.

To export the audio portion of a voice mail message into WAV format, the following steps are followed. A client/server connection is established between the user's client PC 14 and the voice mail server PC 38. Given a list of voice mail messages 180, the user chooses which message to export and what file name to assign to the exported file. The client requests and obtains a file ID for the file on the server which contains the audio portion of a voice mail message. The specified file is opened for reading on the server. At the request of the client, a thread of execution on the server reads a chunk of audio data and sends it to a memory buffer on the client. The client requests three chunks of audio data in this manner, and places them in a queue. The client takes the first chunk from the queue and converts the data from Dialogic ADPCM format (see "Dialogic ADPCM Algorithm", copyright 1988 Dialogic Corporation 00-1366-001) to Waveform Audio File Format (see "Multimedia Programmer's Reference" copyright 1991–1992 Microsoft Corporation PC30212-0492). User configuration options for the conversion include sample rate (6000 Hz, 11025 Hz, etc.), sample size (8 bits, 16 bits), noise filters (high frequency, etc.), and chunk size. While one chunk is being converted, the client requests another chunk from the servers and places the chunk at the end of the queue. This maintains a minimum number of chunks in the queue and reduces processing time. After each chunk has been converted, it is written to the specified WAV file on the client hard disk. After all chunks have been converted, the files on both client and server are closed. The user can use any commonly available WAV file editor (e.g., Microsoft Sound Recorder) to manipulate the audio message.

To import a WAV file into the audio portion of a voice mail message, the following steps are followed. The user can use any commonly available WAV file editor to create a WAV format file. Establish a client/server connection between the user's client PC 14 and the voice mail server PC 38. After creating an outgoing voice mail message, the user chooses which WAV file to import, and where within the message to insert it. The interface has a slider 148 which can be moved to the beginning to insert the WAV file at the beginning of the message or to the end to insert the WAV at the end of the file. Likewise, it can be used to insert the message anywhere in the middle, but the user must play back the message and stop it at the desired point to know how the slider position corresponds with an interval between words within a message. The client requests and obtains a file ID for the file on the server which contains the audio portion of a voice mail message. The specified file is opened for writing on the server. The client reads a chunk of WAV data from the source file into a memory buffer on the client. The client fills three chunks of audio data in this manner, and places them in a queue. The client takes the first chunk from the queue and converts the data from Waveform Audio File Format. The conversion process can handle multiple WAV formats, and adjusts for different sample rates (6000 Hz, 11025 Hz, etc.), and sample sizes (8 bits, 16 bits) found in the source file. After each chunk has been converted, it is sent to the server where it is written to the specified voice message file on the server hard disk. After all chunks have been converted, the files on both client and server are closed.

Figure 4:
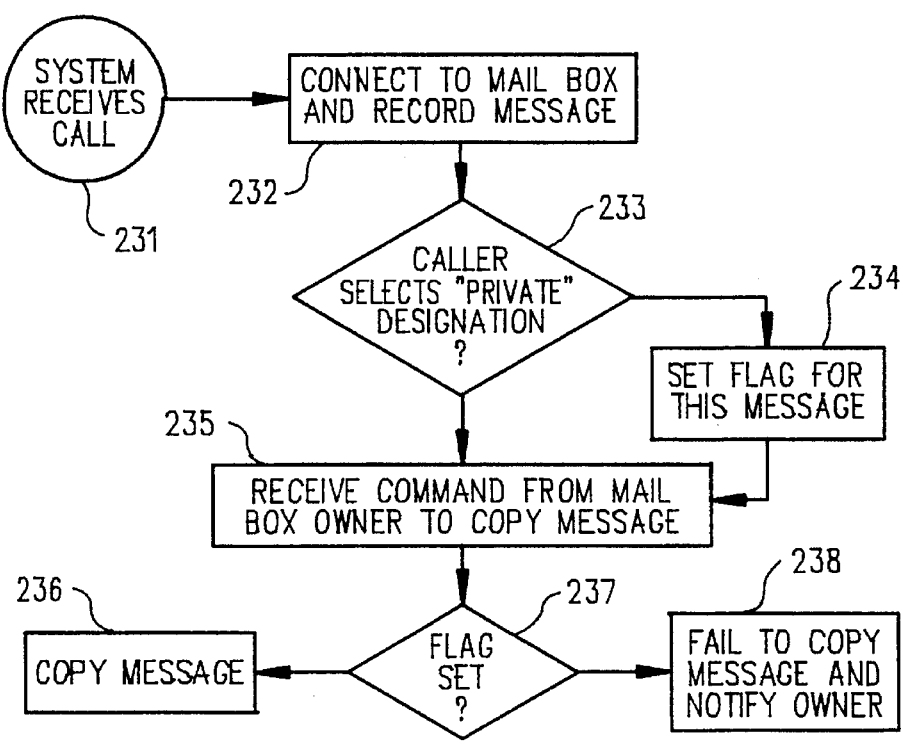
FIG. 4 shows the, method of designating a message as private to prevent copying by the message recipient.

As shown on FIG. 3, a user creating a message to send can select a check box 146 designated "Private". If the message is sent from a simple telephone extension without a display and a pointing device, the caller can be given the choice of designating a voice mail message as private with a typical menu announced by a prompt. As shown in FIG. 4, if the caller selects the "Private" designation, step 233, the system sets a flag for this message, step 234. Then, when the system receives a command from the mail box owner to copy the message, step 235, whether it is to be copied to another voice mail box as a redirect 193 of the message or whether it is to be copied for use as a multimedia WAV file, the system checks to see whether the flag is set, step 237. If the flag is not set, the system copies the message as commanded, step 236. If the flag is set, the system fails to copy the message and notifies the owner that the message was not copied because the message was designated as "Private".

Figure 5:
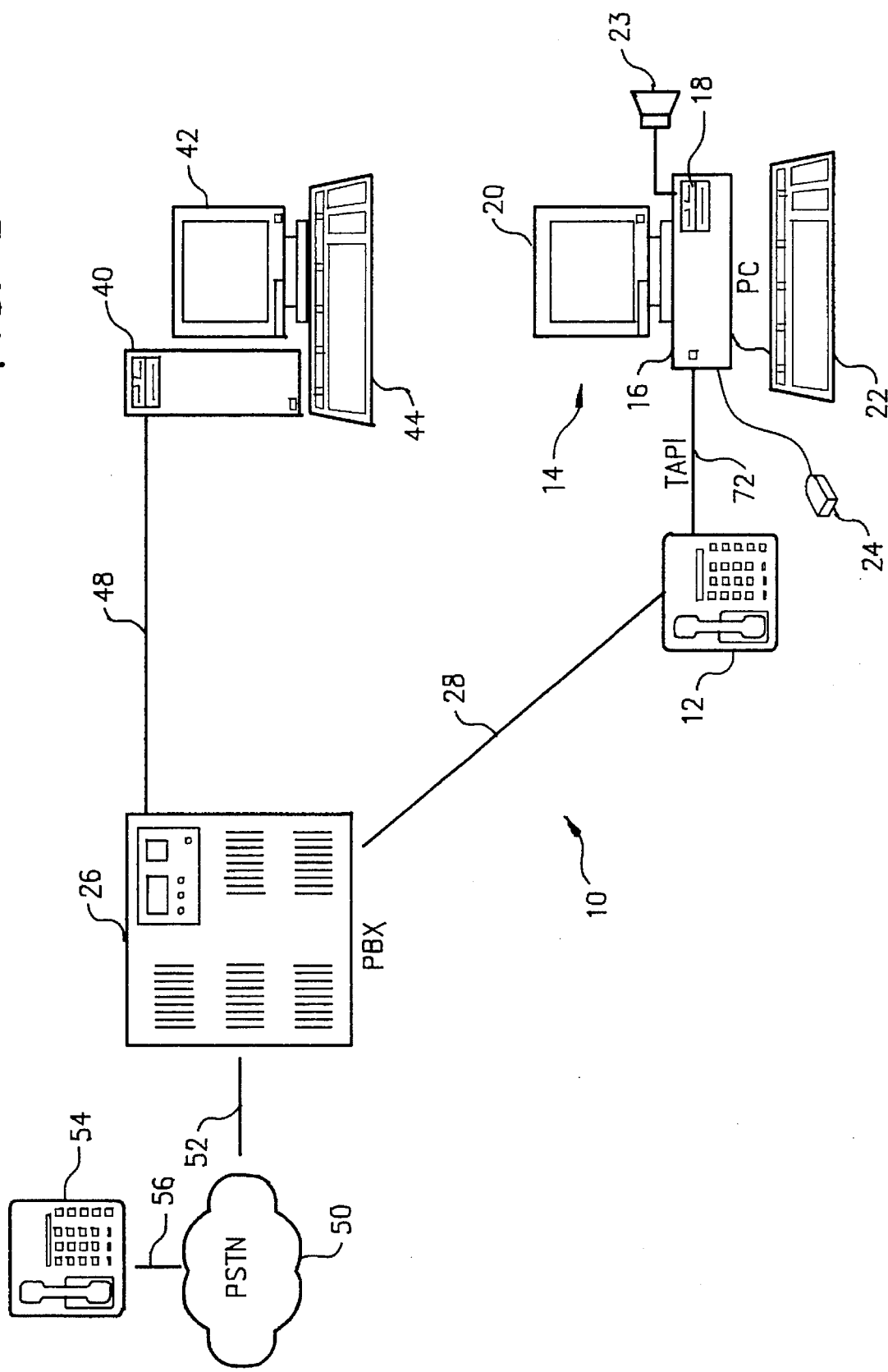
FIG. 5 is a schematic diagram showing an alternative embodiment for carrying out the invention.

FIG. 5 is a schematic diagram showing an alternative embodiment for carrying out an aspect of the invention. In this embodiment, those parts of the apparatus which are unchanged from those described as being part of the preferred embodiment are given the same reference number. Therefore, the only new component in the alternative embodiment of the apparatus of the system is the bidirectional link 72, which connects the user's telephone 12 with the programmed personal computer 14 and forms an alternative bidirectional second communication channel between the PBX 26 and the programmed personal computer 14 through the user's telephone 12.

We claim:

1. A method, in a telephone switching system with a voice mail box for a ,called party with an extension connected to the system via a first communications link, which extension includes a multi-item textual display, for the system to select and transmit to the called party a voice mail message left by a caller, via a second communications link, while the called party is using the first communications link, comprising:
    a. receiving a plurality of calls, each from a caller, directed to the called party's extension and connecting each caller to the called party's voice mail box,
    b. receiving a data set of voice sounds from each caller, separately recording each data set of voice sounds in the mail box,
    c. displaying on the called party's extension's display a list comprised of a plurality of items, each item comprised of a string of characters, one string of characters for each of the plurality of voice sound data sets recorded in the called party's voice mail box,
    d. receiving at the called party's extension a selection by a user of one of the plurality of displayed strings of characters, and
    e. transmitting the data set of voice sounds corresponding to the selected string of characters to the called party's extension, while the called party is using the first communications link, via the second communications link.

2. The method of claim 1 wherein the second communications link is a computer network connection to a computer at the called party's extension.

3. The method of claim 2 wherein the data set of voice sounds is played via a speaker coupled to the computer.

4. A computer readable medium containing software which, when executed in a computer, causes the computer to perform the steps claim 1.

5. The computer readable medium of claim 4 wherein the software further causes the computer to perform the steps of claim 2.

6. The computer readable medium of claim 5 wherein the software further causes the computer to perform the steps of claim 3.

7. A method, in a telephone switching system with a voice mail box for a called party with an extension, which system includes a memory with a plurality of locations, one of which is used for the voice mail box, for the system to prevent copying of a message from a caller to the called party, comprising:
    a. receiving a call from a caller directed to the called party's extension and connecting the caller to the called party's voice mail box,
    b. receiving a message of voice sounds from the caller and recording it in the mail box,
    c. receiving from the caller an indication that the caller chooses to designate the message as "private" and, as a consequence, setting, in the memory, a flag associated with the message,
    d. receiving from the called party a command to copy a portion of the message to another location in a memory, and
    e. reading the flag and, if the flag is set, failing to execute the command.

8. A computer readable medium containing software which, when executed in a computer, causes the computer to perform the steps of claim 7.

9. A method, in a telephone switching system with a voice mail box for a called party with an extension, which system includes a memory for the voice mail box, for the system to permit copying and conversion of a message from digital telephone audio format to computer multimedia format comprising:
    a. receiving a message of digital telephone audio data and recording it in the mail box memory,
    b. receiving from the mail box owner a command to copy a portion of the audio data to another memory,
    c. converting the digital telephone audio data directly into digital computer multimedia audio data by converting the sample rate, the sample size, and the chunk size and
    d. writing to the other memory a file in computer multimedia format containing the portion of the converted audio data.

10. A computer readable medium containing software which, when executed in a computer, causes the computer to perform the steps of claim 9.

11. A method, in a telephone switching system with a voice mail box for a called party with an extension, which system includes a first memory for the voice mail box and a data path to a second memory, for the system, to permit copying and conversion of a set of audio data from computer multimedia format to digital telephone format comprising:
    a. receiving from the mail box owner a command to copy the set of audio data from the second memory to the first memory,
    b. reading from the second memory, in multimedia format, the set of audio data,
    c. converting the digital multimedia format audio data directly into digital telephone audio data by converting the sample rate, the sample size, and the chunk size, and
    d. writing to the first memory a file in digital telephone audio data format containing the portion of the audio data.

12. A computer readable medium containing software which, when executed in a computer, causes the computer to perform the steps of claim 11.

\* \* \* \* \*